US009921521B2

(12) United States Patent
Megawa

(10) Patent No.: US 9,921,521 B2
(45) Date of Patent: Mar. 20, 2018

(54) SHEET PROCESSING APPARATUS FOR DETERMINING LIKELIHOOD OF SHEETS TO STICK AFTER STACKING

(71) Applicants: KABUSHIKI KAISHA TOSHIBA, Tokyo (JP); TOSHIBA TEC KABUSHIKI KAISHA, Tokyo (JP)

(72) Inventor: Shunichi Megawa, Kannami Shizuoka (JP)

(73) Assignees: KABUSHIKI KAISHA TOSHIBA, Tokyo (JP); TOSHIBA TEC KABUSHIKI KAISHA, Tokyo (JP)

( * ) Notice: Subject to any disclaimer, the term of this patent is extended or adjusted under 35 U.S.C. 154(b) by 107 days.

(21) Appl. No.: 14/288,343

(22) Filed: May 27, 2014

(65) Prior Publication Data

US 2015/0346633 A1 Dec. 3, 2015

(51) Int. Cl.

| | |
|---|---|
| ***G06F 15/00*** | (2006.01) |
| ***G03G 15/08*** | (2006.01) |
| ***G03G 15/00*** | (2006.01) |
| ***B65H 7/20*** | (2006.01) |
| ***G03G 21/00*** | (2006.01) |
| ***B65H 29/60*** | (2006.01) |
| ***B65H 31/24*** | (2006.01) |
| ***B65H 43/06*** | (2006.01) |
| ***B41J 29/26*** | (2006.01) |

(52) U.S. Cl.

CPC .......... *G03G 15/0831* (2013.01); *B41J 29/26* (2013.01); *B65H 7/20* (2013.01); *B65H 29/60* (2013.01); *B65H 31/24* (2013.01); *B65H 43/06* (2013.01); *G03G 15/6529* (2013.01); *G03G 21/00* (2013.01); *B41J 2202/30* (2013.01); *B65H 2301/133* (2013.01); *B65H 2301/33312* (2013.01); *B65H 2301/5111* (2013.01); *B65H 2511/30* (2013.01); *B65H 2511/512* (2013.01); *B65H 2601/273* (2013.01); *G03G 15/6573* (2013.01)

(58) Field of Classification Search

None

See application file for complete search history.

(56) References Cited

U.S. PATENT DOCUMENTS 5,026,037 A * 6/1991 Masuda ............... G03G 15/234 271/291

2004/0105700 A1 * 6/2004 Herrmann .......... G03G 15/6582 399/159

(Continued)

FOREIGN PATENT DOCUMENTS

JP H07-234617 A 9/1995

OTHER PUBLICATIONS

U.S. Appl. No. 14/069,788, filed Nov. 1, 2013.

*Primary Examiner* — Helen Q Zong

(74) *Attorney, Agent, or Firm* — Patterson & Sheridan, LLP

(57) ABSTRACT

A sheet processing apparatus comprises a sheet placing section in which recording media are stacked, a storage section configured to record a total amount of toner on the recording media stacked in the sheet placing section, and a control section configured to determine whether or not the recording media stacked in the sheet placing section is likely to stick when a new recording medium is stacked thereon, based on the total amount of toner on the recording media stacked in the sheet placing section.

11 Claims, 7 Drawing Sheets

(56) References Cited

U.S. PATENT DOCUMENTS

| | | | | |
|---|---|---|---|---|
| 2009/0028587 | A1 * | 1/2009 | Hanashi | G03G 15/234 399/27 |
| 2012/0188571 | A1 * | 7/2012 | Amano | B65H 43/00 358/1.12 |
| 2013/0070265 | A1 | 3/2013 | Megawa et al. | |

* cited by examiner

SHEET PROCESSING APPARATUS FOR DETERMINING LIKELIHOOD OF SHEETS TO STICK AFTER STACKING

FIELD

Embodiments described herein relate to a sheet processing apparatus which determines the likelihood of sheets subjected to a toner heating process in an image forming apparatus or an image erasing apparatus to stick after stacking, and the like.

BACKGROUND

A sheet processing apparatus heats a sheet having a toner image to decolor the toner, and stacks the heated sheet in a sheet storage section. Upper and lower sheets that are stacked in the sheet storage section may stick to each other because the toner still remains on the heated sheets even after the heating process to decolor the toner. In addition, as the weight of the sheets stacked in the sheet storage section increases, the upper and lower sheets at the bottom of the stack are more likely to stick to each other due to the pressure from the increased weight. As a result, in order to prevent the sticking of sheets caused by the weight, it is necessary to urge a user to remove the sheets at an early time, i.e., before the stacked sheets stick to each other due to the pressure from the increased weight of the stack. In a case where the sheet removing time is set too early, the sheet removing operation performed by the user becomes more and more frequent, and this leads to lower productivity.

DETAILED DESCRIPTION

In accordance with one embodiment, a sheet processing apparatus comprises a sheet placing section in which recording media are stacked, a storage section configured to record a total amount of toner on the recording media stacked in the sheet placing section, and a control section configured to determine whether or not the recording media stacked in the sheet placing section is likely to stick when a new recording medium is stacked thereon, based on the total amount of toner on the recording media stacked in the sheet placing section.

Embodiments are described below.

Figure 1:
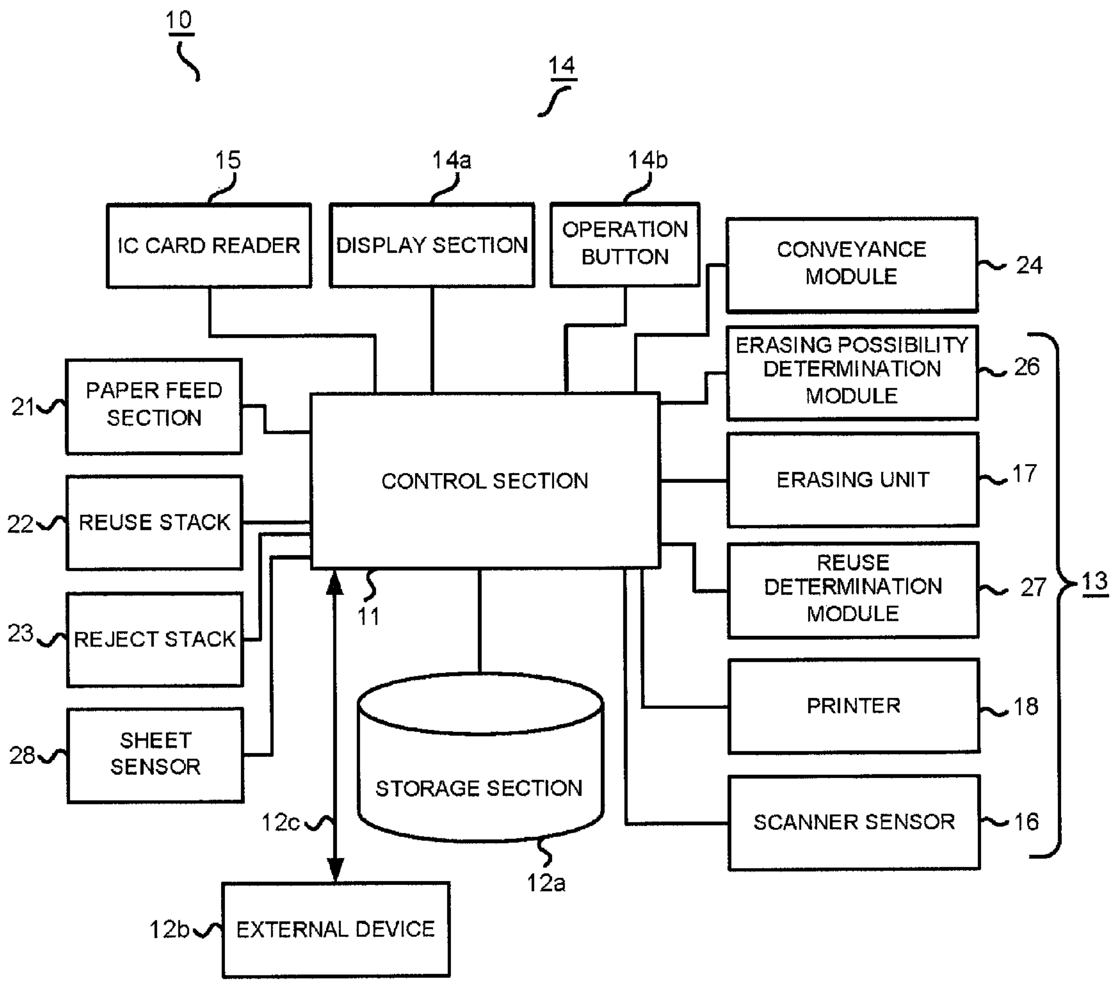
FIG. 1 is a block diagram of an erasing apparatus according to one embodiment.

FIG. 1 is a diagram illustrating an erasing apparatus 10 serving as an image erasing apparatus provided with a sheet processing apparatus according to the embodiment. The erasing apparatus 10 comprises a control section 11 for controlling the entire erasing apparatus 10 and a storage section 12*a*. The control section 11, which is a controller, is connected with an external device 12*b* via an interface 12*c*. The erasing apparatus 10 further includes an erasing mechanism 13, a control panel 14, an IC card reader 15, a paper feed section 21, a reuse stack 22 and a reject stack 23 serving as sheet placing sections, a conveyance module 24, a sheet sensor 28 and the like.

The reuse stack 22 and the reject stack 23 may be independent from the main body of the erasing apparatus 10. The erasing apparatus 10 may arrange the reuse stack 22 or the reject stack 23 outside the main body thereof as a post-processing apparatus for processing a sheet on which a printed image is erased.

The storage section 12*a* is a memory which stores data of the erasing apparatus 10 such as a job history, the number of erased sheets, the number of rejected sheets, per user, department, day of the week, week, month and the like. The storage section 12*a* stores erasing data and the like in association with, for example, the job history. The storage section 12*a* stores, for example, image information serving as erasing data, reuse times mark, printing ratio mark and the like. The reuse times mark refers to a mark for recording how many times the sheet has been reused, and the printing ratio mark is a mark for recording the printing ratio of an image printed on a sheet in the past.

The storage section 12*a* stores, for example, toner printing ratio calculated according to the image information of a sheet serving as a recording medium and a cumulative printing ratio obtained by accumulating the printing ratio of each of a plurality of sheets. The storage section 12*a* further stores, for example, a cumulative count obtained by accumulating the reuse times mark of each of a plurality of sheets and a cumulative printing ratio obtained by accumulating the printing ratio mark of each of a plurality of sheets.

The toner printing ratio, the cumulative printing ratio, the cumulative count and the cumulative printing ratio stored in the storage section 12*a* are all cleared to 0 when the sheet is removed from the reuse stack 22. The sheet sensor 28 detects that the sheet is removed from the reuse stack 22 or the reject stack 23. No specific limitation is given to the structure of the sheet sensor 28 as long as the sheet sensor 28 is a device which detects the existence of sheets in, for example, the reuse stack 22 or the reject stack 23. For example, the sheet sensor 28 may determine whether or not a sheet is removed according to the detachment or attachment of the reuse stack 22 or the reject stack 23 from or to the erasing apparatus 10. Instead of using the sheet sensor 28, a message indicating that the sheet is removed from the reuse stack 22 or the reject stack 23 may also be input by a user from the control panel 14

The storage section 12*a* stores, for example, a first threshold value, a second threshold value and a third threshold value preset in the erasing apparatus 10. The first threshold value is, for example, a threshold value of a total printing ratio of a plurality of sheets stacked in the reuse stack 22. The total printing ratio is obtained by adding a new toner printing ratio to the cumulative printing ratio. The new toner printing ratio is obtained according to the new image information of a sheet serving as a recording medium newly read by a scanner sensor 16. In a case where the total printing ratio of a plurality of sheets stacked in the reuse stack 22 is smaller than the first threshold value, the control section 11 predicts that the sheets in the reuse stack 22 won't stick to another.

The second threshold value is, for example, a threshold value of a printing ratio of opposing surfaces obtained by adding up the toner printing ratios of two opposing surfaces of upper and lower sheets stacked in the reuse stack 22. In a case where the printing ratio of opposing surfaces obtained by adding up the printing ratios of two opposing surfaces of upper and lower sheets stacked in the reuse stack 22 is smaller than the second threshold value, the control section 11 predicts that the two opposing surfaces of the sheets in the reuse stack 22 won't stick.

The third threshold value is, for example, a threshold value of total times of a plurality of sheets stacked in the reuse stack 22. The total times is obtained by adding a new reuse times mark to the cumulative times. The new reuse times mark is obtained from the new image information of a sheet newly read by the scanner sensor 16. In a case where the total times of a plurality of sheets stacked in the reuse stack 22 is smaller than the third threshold value, the control section 11 predicts that the sheets in the reuse stack 22 won't stick to another.

The control panel 14 comprises a touch panel type display section 14*a* and an operation button 14*b*. The display section 14*a* displays a user selectable job mode, the state of the erasing apparatus 10, the state of the reuse stack 22 or the reject stack 23, and the like. The user operates the display section 14*a* or the operation button 14*b* to designate the job mode, and removes the sheet from the reuse stack 22 or the reject stack 23.

The external interface 12*c* is connected with the external device 12*b* such as a server or an MFP (Multi-Function-Peripheral) through a network. The IC card reader 15 is used for a personal authentication of a user and the like.

The paper feed section 21 supplies a sheet serving as a recording medium to the conveyance module 24. The conveyance module 24 conveys the sheet to the erasing mechanism 13 or the reject stack 23. Then the conveyance module 24 conveys the sheet passing through the erasing mechanism 13 to the reuse stack 22 or the reject stack 23. The technology for conveying a sheet may be, for example, the technology disclosed in the US publication of US patent application US 2013/0070265.

Figure 2:
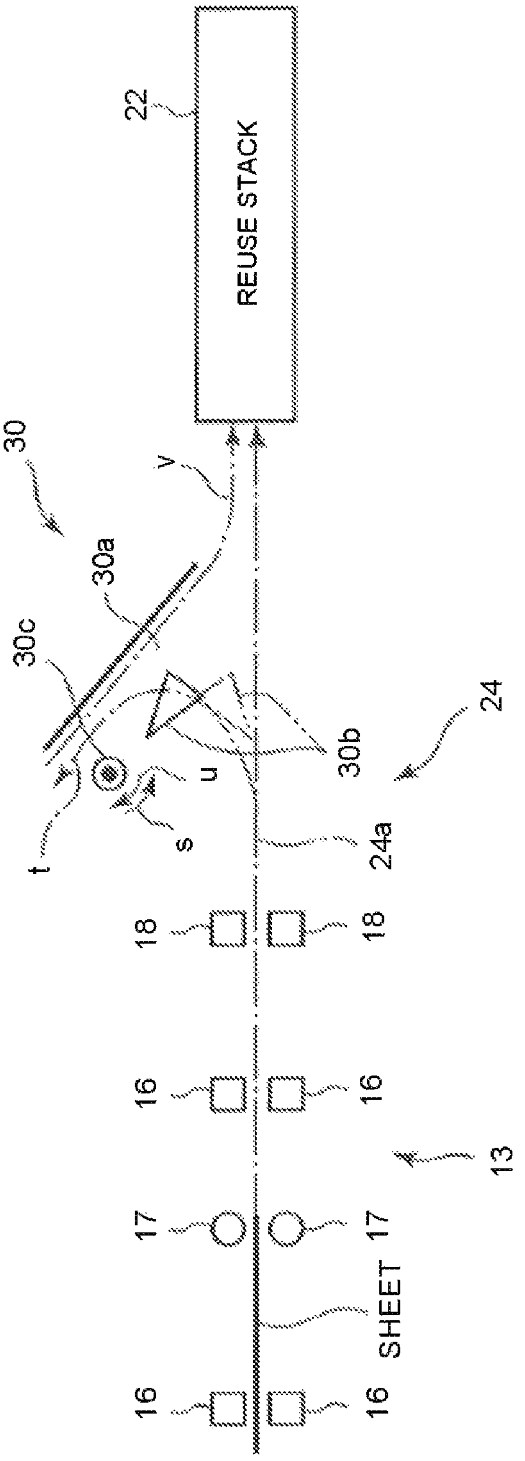
FIG. 2 is a schematic diagram of a reversal mechanism according to the embodiment.

The conveyance module 24 includes, for example, a reversal mechanism 30 shown in FIG. 2. The conveyance module 24 reverses the front and the back sides of the sheet passing through the erasing mechanism 13 using the reversal mechanism 30 as needed, and then conveys the sheet to the reuse stack 22. The reversal mechanism 30 is provided with a reversal conveying path 30*a* for reversing the front and the back sides of the sheet passing through the erasing mechanism 13 arranged on a conveying path 24*a* of the conveyance module 24. The reversal mechanism 30 has a gate claw 30*b* at a branching position of the conveying path 24*a* and the reversal conveying path 30*a*. The reversal mechanism 30 further comprises a switchback roller 30*c* for reversing the sheet conveyance direction on the reversal conveying path 30*a*.

In a case where the front and the back sides of the sheet are not reversed after the sheet passes through the erasing mechanism 13, the gate claw 30*b* is switched to a position shown by a solid line in FIG. 2. The conveyance module 24 conveys the sheet passing through the gate claw 30*b* to the reuse stack 22 without reversal. And in a case where the front and the back sides of the sheet are reversed after the sheet passes through the erasing mechanism 13, the gate claw 30*b* is switched to a position shown by a dotted line in FIG. 2. The conveyance module 24 distributes the sheet to the reversal conveying path 30*a* with the gate claw 30*b*. The conveyance module 24 conveys the sheet on the reversal conveying path 30*a* in a direction shown by an arrow t through the switchback roller 30*c* which rotates in a direction shown by an arrow s. When the rear end of the sheet passes through the gate claw 30*b*, the conveyance module 24 reverses the switchback roller 30*c* in a direction shown by an arrow u to switchback and convey the sheet in a direction shown by an arrow v. The conveyance module 24 conveys the sheet of which the front and the backsides are reversed on the reversal conveying path 30*a* to the reuse stack 22.

The reuse stack 22 stores a reusable sheet subjected to an erasing processing in the erasing mechanism 13, while the reject stack 23 collects a sheet which is not reusable. The sheet sensor 28 detects the existence of the sheet in the reuse stack 22 or the reject stack 23.

The erasing mechanism 13 comprises the scanner sensor 16 serving as a reading section, an erasing unit 17 serving as an erasing section, a printer 18, an erasing possibility determination module 26, a reuse determination module 27 and the like.

The erasing possibility determination module 26 includes a sensor for detecting the thickness of the fed sheet or a foreign substance and the like, and if the erasing possibility determination module 26 determines that the erasing processing can be carried out on the sheet, the control section 11 gives an instruction to the erasing mechanism 13 to erase the toner image on the sheet. If the erasing possibility determination module 26 determines that the erasing processing cannot be carried out on the sheet, the control section 11 gives an instruction not to erase the toner image on the sheet to the erasing mechanism 13, but to convey the sheet to the reject stack 23.

The scanner sensor 16 reads the printed image, that is, the toner image formed on the sheet. The scanner sensor 16 also reads a reuse times mark or a printing ratio mark and the like if a reuse times mark or a printing ratio mark is formed in, for example, a non-image area of the sheet. The technology for reading (detecting) the reuse times mark may be, for example, the technology disclosed in Japanese Unexamined Patent Application Publication No. Hei 7-234617. The technology for reading the printing ratio mark and detecting the total printing ratio may be, for example, the technology disclosed in the US publication of US patent application US 2013/0070265.

The scanner sensor 16 may include two scanners which are arranged opposite to each other across the conveying path 24*a* of the conveyance module 24. Alternatively, the scanner sensor 16 may also include only one scanner to read two surfaces of the sheet switched back by the conveyance module 24.

The printed image is formed with an erasable (decolorable) toner. For example, the erasable toner can be erased (decolored) by heating. The reuse times mark or the printing ratio mark and the like formed in the non-image area of the sheet is printed with a toner or ink which cannot be erased (color erased). Alternatively, a pinhole and the like may be formed on the sheet using a puncher as the reuse times mark or the printing ratio mark.

The scanner sensor 16 reads image information from the printed image formed on the sheet before the printed image is erased. The scanner sensor 16 reads whether or not the printed image is actually erased after the printed image is subjected to the erasing processing. The storage section 12*a* stores the image information of the printed image, the reuse times mark or the printing ratio mark and the like read by the scanner sensor 16.

The erasing unit 17 heats the sheet to erase the printed image formed on the sheet. The erasing unit 17 heats the sheet to a temperature higher than a toner erasing temperature at which the erasable toner is erased. The erasable toner is formed by, for example, adding coloring material, color generation compound and color developing material to binder resin. If the printed image formed with an erasable toner is heated to a temperature higher than the toner erasing temperature, the color generation compound and the color developing material in the erasable toner are separated from each other, thereby erasing the printed image.

The reuse determination module 27 includes a sensor for detecting the sheet of which the printed image is erased so as to detect whether or not the printed image is erased or whether or not the sheet is damaged. The control section 11 determines whether or not the sheet can be reused according to the detection of the reuse determination module 27.

If it is determined that the sheet cannot be reused, the control section 11 gives an instruction to the conveyance module 24 to convey the sheet to the reject stack 23. If it is determined that the sheet can be reused, the control section 11 gives an instruction to the conveyance module 24 to convey the sheet to the printer 18.

The printer 18 prints a non-erasable reuse times mark or a printing ratio mark and the like in the non-image area of the sheet by using, for example, an inkjet printer. For example, the printer 18 prints one erasing mark in the non-image area of the sheet every time the printed image on the sheet is erased by the erasing unit 17. The number of erasing marks formed in the non-image area of the sheet corresponds to the number of times the sheet has been reused. Alternatively, the printer 18 prints, for example, a printing history mark indicating the toner printing ratio of the printed image in the non-image area of the sheet every time the printed image on the sheet is erased by the erasing unit 17.

The control section 11 calculates the toner printing ratio according to the image information read by the scanner sensor 16. In order to calculate the toner printing ratio, the control section 11 converts an image signal into binary form, and compares the RGB value of each pixel with a predetermined threshold value of the RGB value. The control section 11 determines the pixels that have an RGB value that is smaller than the threshold value to be black pixels, and the pixels that have an RGB value that is greater than the threshold value to be white pixels. The control section 11 sets the percentage of the number of the black pixels against the total number of the pixels of the sheet as the toner printing ratio.

For example, as a first prediction control, the control section 11 predicts the sticking of the sheets according to the total printing ratio. The control section 11 adds up the toner printing ratio of each of a plurality of sheets to set the cumulative printing ratio. The storage section 12*a* stores, for example, the toner printing ratio and the cumulative printing ratio of each sheet. The control section 11 calculates a new toner printing ratio according to the new image information of the sheet serving as a recording medium newly read by the scanner sensor 16. The control section 11 adds the new toner printing ratio to the cumulative printing ratio to calculate the total printing ratio. If the total printing ratio is greater than the first threshold value, the control section 11 predicts that the sheets stacked in the reuse stack 22 will stick.

If it is predicted that the sheets in the reuse stack 22 will stick, the control section 11, for example, stops the paper feed section 21 and then stops the color erasing operation of the erasing apparatus 10. Further, the control section 11 displays a warning of ‘it is predicted that the sheets will stick’ on the display section 14*a* to urge the user to remove the sheets from the reuse stack 22. If the total printing ratio is smaller than the first threshold value, the control section 11 updates the cumulative printing ratio stored in the storage section 12*a* to the calculated total printing ratio.

For example, as a second prediction control, the control section 11 predicts the sticking of the upper and lower sheets according to the printing ratio of opposing surfaces. The control section 11 adds up the toner printing ratios of the opposing surfaces of the upper and lower sheets as they are stacked in the reuse stack 22 to set the printing ratio of opposing surfaces. The storage section 12*a* records, for example, the toner printing ratio of an upper surface of a preceding sheet in the reuse stack 22. The control section 11 calculates a new toner printing ratio of the opposing surface of a subsequent sheet read by the scanner sensor 16, and then adds the new toner printing ratio to the toner printing ratio of the upper surface recorded in the storage section 12*a* to calculate the printing ratio of opposing surfaces. If the printing ratio of opposing surfaces is greater than the second threshold value, the control section 11 predicts that the opposing surfaces of the upper and lower sheets in the reuse stack 22 will stick.

If it is predicted that the upper and lower sheets in the reuse stack 22 will stick, the control section 11, for example, stops the paper feed section 21 and then stops the color erasing operation of the erasing apparatus 10. Further, the control section 11 displays a warning of ‘it is predicted that the upper and lower sheets will stick’ on the display section 14*a* to urge the user to remove the sheets from the reuse stack 22.

For example, as a third prediction control, the control section 11 predicts the sticking of the sheets according to the total number of reuse times. The control section 11 accumulates the reuse times marks read by the scanner sensor 16 from each of a plurality of sheets to calculate the cumulative count and then stores the cumulative count in the storage section 12*a*. The control section 11 adds a new reuse times mark of a sheet newly read by the scanner sensor 16 to the cumulative count to calculate the total times. If the value of the total times is greater than the third threshold value, the control section 11 predicts that the sheets stacked in the reuse stack 22 will stick.

According to the prediction of the sticking of the sheets, the control section 11, for example, stops the color erasing operation of the erasing apparatus 10 and displays a warning of ‘it is predicted that the sheets will stick’ on the display section 14*a* to urge the user to remove the sheets from the reuse stack 22. If the value of the total times is smaller than the third threshold value, the control section 11 updates the cumulative count stored in the storage section 12*a* to the calculated total times.

For example, as a fourth prediction control, the control section 11 predicts the sticking of the sheets according to the total printing ratio. The control section 11 accumulates the printing ratio represented by the marks on the sheets read by the scanner sensor 16 to calculate the cumulative printing ratio and then stores cumulative printing ratio in the storage section 12*a*. The control section 11 adds a new printing ratio represented by a mark on the sheet that is newly read by the scanner sensor 16 to the cumulative printing ratio to calculate the total printing ratio. If the total printing ratio exceeds the threshold value of the printing ratio, the control section 11 predicts that the sheets stacked in the reuse stack 22 will stick.

If it is predicted that the sheets will stick, the control section 11, for example, stops the color erasing operation of the erasing apparatus 10 and displays a warning of ‘it is predicted that the sheets will stick’ on the display section

14*a* to urge the user to remove the sheets from the reuse stack 22. If the total printing ratio does not exceed the threshold value of the printing ratio, the control section 11 updates the cumulative printing ratio stored in the storage section 12*a* to the total printing ratio history.

Example 1

Figure 3:
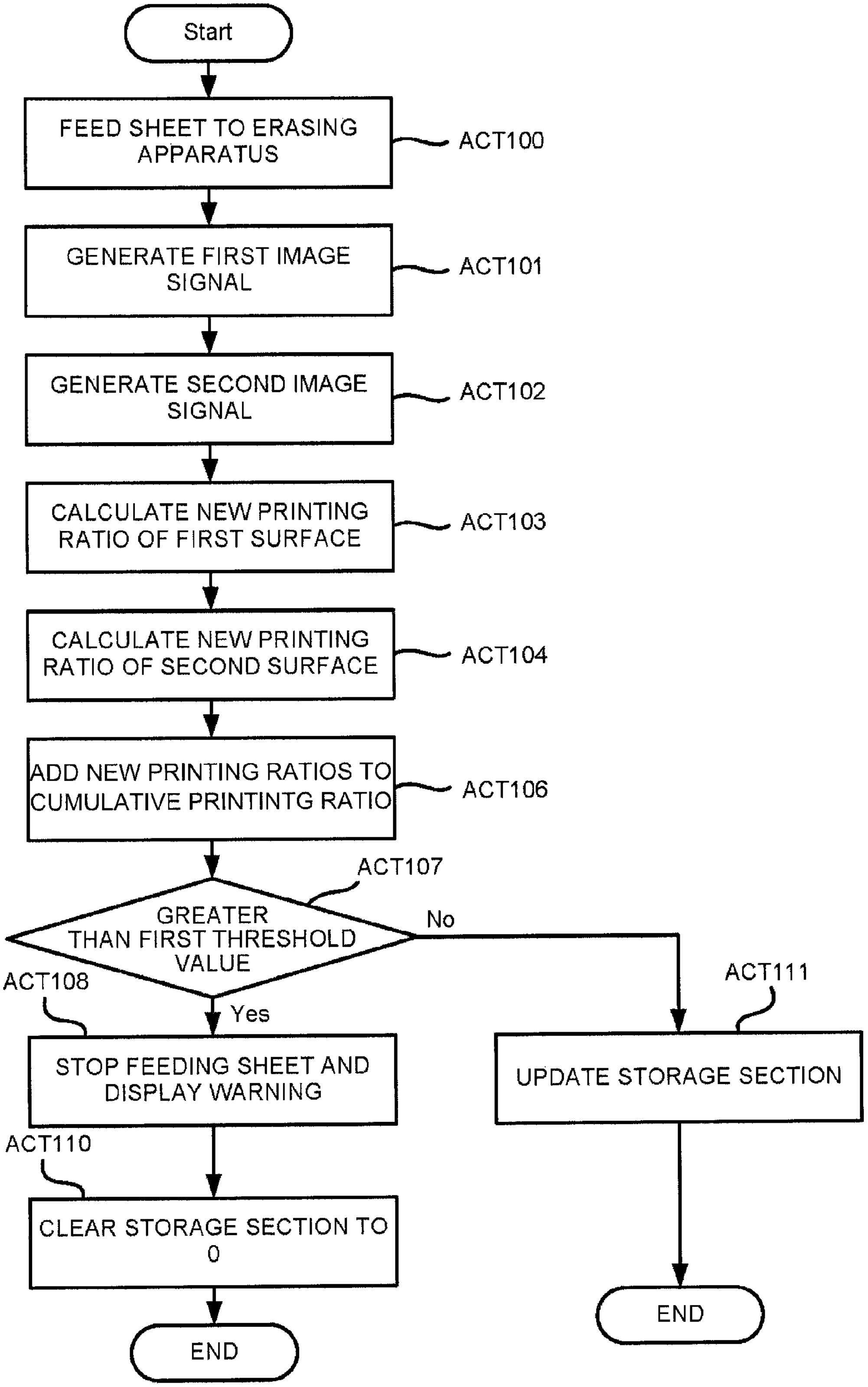
FIG. 3 is a flowchart illustrating a first example of a sheet sticking prediction method according to an embodiment.

In example 1 of the embodiment, the control section 11 carries out the first prediction control to predict the sticking of the sheets. The sheet sticking prediction of example 1 is described with reference to the flowchart shown in FIG. 3.

In example 1, the user sets sheets in the paper feed section 21, activates a start key through the operation button 14*b* to start an image erasing operation. The control section 11 gives an instruction to the paper feed section 21 to feed a sheet (ACT 100). The control section 11 instructs the scanner sensor 16 to read a first surface of the sheet before the erasing processing, and generates a first image signal (ACT 101). The control section 11 instructs the scanner sensor 16 to read a second surface of the sheet before the erasing processing, and generates a second image signal (ACT 102).

The control section 11 calculates a new printing ratio of the first surface of the sheet according to the first image signal (ACT 103). The control section 11 calculates a new printing ratio of the second surface of the sheet according to the second image signal (ACT 104). The control section 11 adds the new printing ratio of the first surface and the new printing ratio of the second surface to the cumulative printing ratio stored in the storage section 12*a* to calculate the total printing ratio (ACT 106). The control section 11 compares the total printing ratio with the first threshold value to determine whether or not the total printing ratio is greater than the first threshold value (ACT 107).

If the total printing ratio is greater than the first threshold value (YES in ACT 107), the control section 11 predicts that the sheets in the reuse stack 22 will stick to each other, and the flow proceeds to (ACT 108). In ACT 108, the control section 11 gives an instruction to the paper feed section 21 to stop feeding a next sheet, and instructs the display section 14*a* to display a warning of 'it is predicted that the sheets will stick'.

The user removes the sheets in the reuse stack 22 according to the warning displayed on the display section 14*a*. If the sheet sensor 28 detects that the sheets in the reuse stack 22 are removed, the control section 11 clears the cumulative printing ratio, the cumulative count and the cumulative printing ratio history stored in the storage section 12*a* to 0 (ACT 110), and then the sheet sticking prediction is ended.

In (ACT 107), if the total printing ratio is smaller than the first threshold value (NO in ACT 107), the control section 11 updates the cumulative printing ratio stored in the storage section 12*a* to the total printing ratio (ACT 111). If the cumulative printing ratio stored in the storage section 12*a* is updated in ACT 111, the sheet sticking prediction is ended. During the sheet sticking prediction period, the control section 11 erases the printed image on the sheet using the erasing unit 17 after the processing in (ACT 101) and (ACT 102) is carried out.

In example 1, if the total printing ratio containing the printing ratios obtained from the image signals of the first surface and the second surface of the sheet is greater than the first threshold value, a warning of 'it is predicted that the sheets will stick' is displayed for a user to urge the user to remove the sheets from the reuse stack 22. Thereby, the user can remove the sheets before the sheets stick to each other at timing when the sticking of the sheets is predicted according to the total printing ratio, instead of a preset sheet removal time. The method of example 1 may thus prevent frequent sheet removing operations performed by the user, thereby improving the operability in a case of reusing a sheet.

Figure 4:
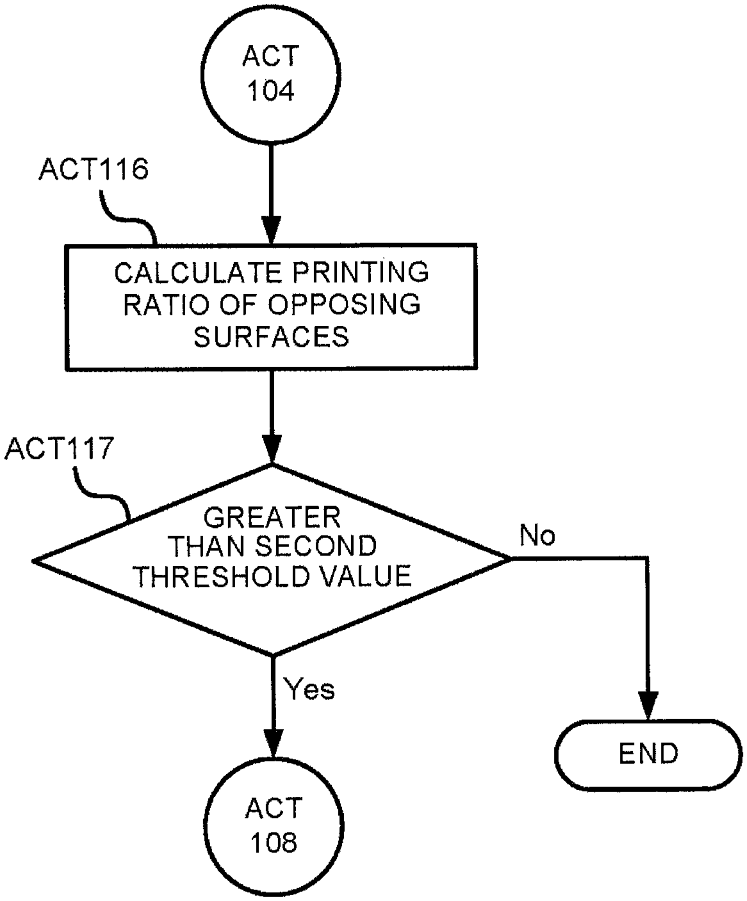
FIG. 4 is a flowchart illustrating a method of predicting the sticking of the upper and lower sheets according to the embodiment.

The method of example 1 may, for example, comprise a subroutine shown in the flowchart in FIG. 4 to predict the sticking of the upper and lower sheets stacked in the reuse stack 22.

The control section 11 proceeds to ACT 116 of the subroutine for predicting the sticking of the upper and lower sheets after the printing ratio of the second surface (opposing surface) of the sheet is calculated in ACT 104. In ACT 116, the control section 11 adds the new printing ratio of the second surface (opposing surface) calculated in ACT 104 to the toner printing ratio of the upper surface of the preceding sheet recorded in the storage section 12*a* to calculate the printing ratio of opposing surfaces. The control section 11 compares the printing ratio of opposing surfaces with the second threshold value to determine whether or not the printing ratio of opposing surfaces is greater than the second threshold value (ACT 117).

In a case where the printing ratio of opposing surfaces is greater than the second threshold value (YES in ACT 117), the control section 11 predicts that the upper surface of the preceding sheet will stick to the opposing surface of the following sheet in the reuse stack 22. In a case of (YES in ACT 117), the control section 11 proceeds to ACT 108. In a case where the printing ratio of opposing surfaces is not greater than the second threshold value (NO in ACT 117), the control section 11 predicts that the upper surface of the preceding sheet will not stick to the opposing surface of the following sheet, and then the subroutine is ended.

In example 1, the processing in ACTs 116 and 117 in the subroutine is carried out to directly predict the sticking of the upper and lower sheets stacked in the reuse stack 22. Thus, even if the sticking of the sheets is not predicted according to the total printing ratio, the sticking of the upper and lower sheets is predicted, therefore the user is urged to remove the sheets, thereby surely preventing the sticking of the sheets.

Example 2

Figure 5:
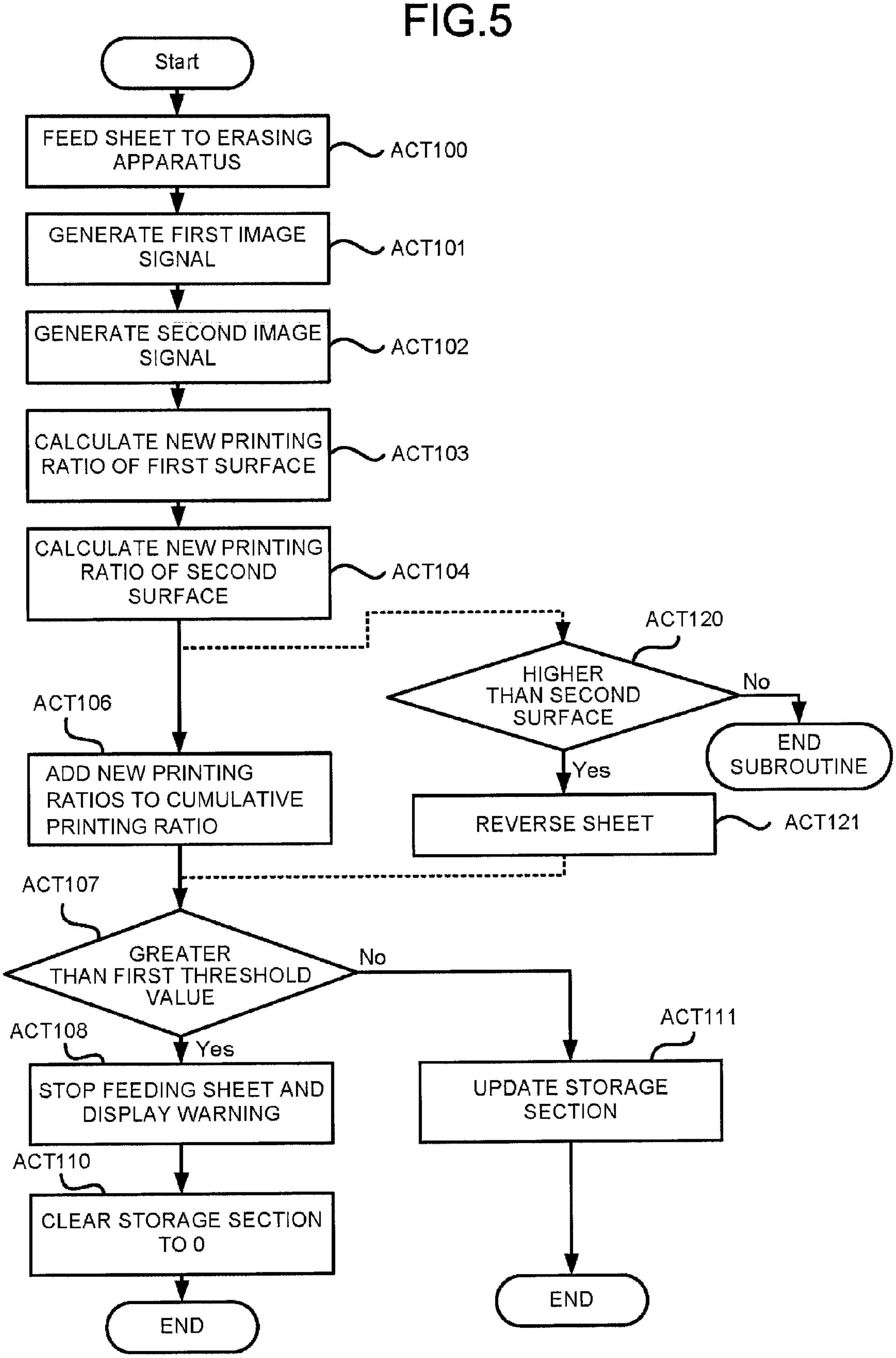
FIG. 5 is a flowchart illustrating a second example of the sheet sticking prediction method according to the embodiment.

In example 2 of the embodiment, the control section 11 stacks the sheet in the reuse stack 22 with the surface having, for example, a lower printing ratio facing upward generally. In example 2, the surfaces having high printing ratio are prevented from being opposed to each other, thereby avoiding the sticking of the upper and lower sheets stacked in the reuse stack 22. The sheets may also be stacked in the reuse stack 22 with the surface having a higher printing ratio facing upward generally. In example 2, the control section 11 may predict the sticking of the sheets in the reuse stack 22 using, for example, the total printing ratio, as in example 1. The control on the direction of the sheet in example 2 is described with reference to the flowchart in FIG. 5.

After the image erasing operation of the erasing apparatus 10 is started, the processing from (ACT 100) to (ACT 104) is the same as in example 1. As in example 1, after the control section 11 calculates the new printing ratio of the second surface of the sheet in (ACT 104), (ACT 106) and (ACT 107) are taken. In a case of (YES in ACT 107), the control section 11 carries out the processing in (ACT 108) and (ACT 110) and then ends the sheet sticking prediction, as in example 1. In a case of (NO in ACT 107), the control section 11 carries out the processing in (ACT 111), and then ends the sheet sticking prediction, as in example 1.

After the control section 11 calculates the new printing ratio of the second surface of the sheet in (ACT 104), ACT 120 serving as a subroutine is executed so that the sheet faces the desired direction. In example 2, the new printing ratios of the first surface and the second surface of the sheet to be stacked in the reuse stack 22 are compared, and the sheets in the reuse stack 22 are stacked with the surface having, for example, a lower printing ratio facing upward. After the processing in (ACT 104) is carried out, the control section 11 proceeds to (ACT 120) of the subroutine.

In ACT 120, the control section 11 compares the new printing ratio of the first surface with that of the second surface. In ACT 120, if it is determined that the new printing ratio of the first surface is higher than that of the second surface (YES in ACT 120), the control section 11 reverses the first surface and the second surface of the sheet using the reversal mechanism 30 of the conveying path 24*a* shown in FIG. 2 (ACT 121). The control section 11 discharges the reversed sheet and stacks the sheet in the reuse stack 22 with the second surface having a lower printing ratio facing upward.

In (ACT 120), if it is determined that the new printing ratio of the first surface is lower than that of the second surface, the control section 11 ends the subroutine. The control section 11 discharges the sheet without reversing the sheet and then stacks the sheet in the reuse stack 22 with the first surface having a lower printing ratio facing upward. As a result, the surfaces having high printing ratio are prevented from being opposed to each other, thereby avoiding the sticking of the upper and lower sheets in the reuse stack 22.

During the sheet sticking prediction period, the control section 11 erases the printed image on the sheet using the erasing unit 17 after the processing in (ACT 101) and (ACT 102) is carried out.

In example 2, the printing ratio obtained from the image signals of the first surface and the second surface of the sheet is calculated, and the sheet is stacked in the reuse stack 22 with the surface having a lower printing ratio facing upward. Therefore, the surfaces having high printing ratios are prevented from being opposed to each other, thereby avoiding the sticking of the upper and lower sheets in the reuse stack 22. As in example 1, the method of example 2 predicts the sticking of the sheets according to the total printing ratio, and removes the sheets before the sheets stick to each other at timing when the sticking of the sheets is predicted. The method of example 2 prevents frequent sheet removing operations performed by the user, thereby improving the operability in a case of reusing a sheet.

Example 3

Figure 6:
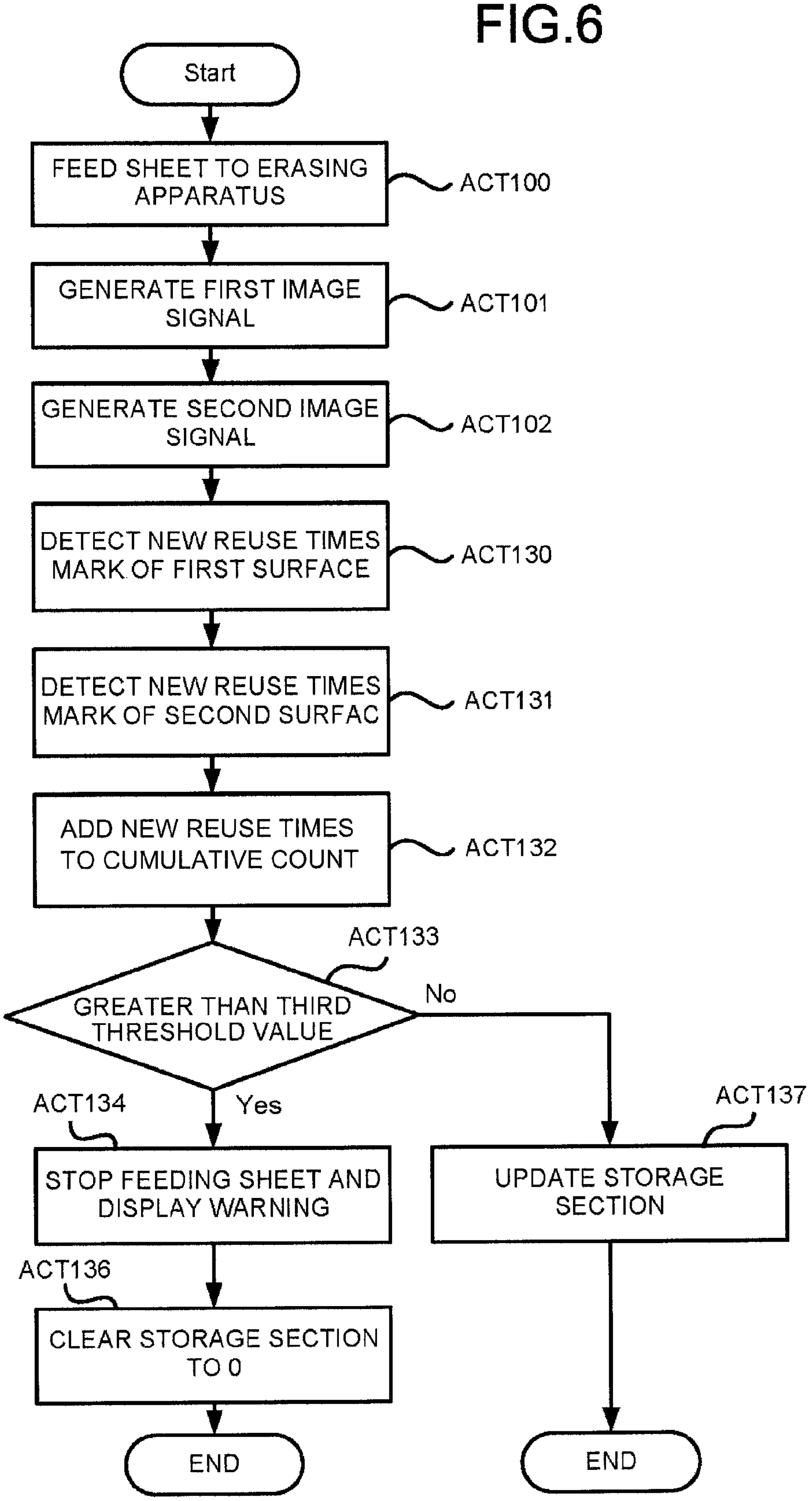
FIG. 6 is a flowchart illustrating a third example of the sheet sticking prediction method according to the embodiment.

In example 3 of the embodiment, the control section 11 carries out the third prediction control to predict the sticking of the sheets. The sheet sticking prediction in example 3 is described with reference to the flowchart shown in FIG. 6.

After the image erasing operation of the erasing apparatus 10 is started, the processing from (ACT 100) to (ACT 102) is the same as in example 1. If the second image signal is generated in (ACT 102), the control section 11 detects a new reuse times mark of the first surface of the sheet from the first image signal (ACT 130). The control section 11 detects a new reuse times mark of the second surface of the sheet from the second image signal (ACT 131). The control section 11 adds the number of the detected new reuse times marks of the first surface and the second surface to the cumulative count stored in the storage section 12*a* to calculate the total times (ACT 132). And then the control section 11 compares the total times with the third threshold value to determine whether or not the value of the total times is greater than the third threshold value (ACT 133).

If the value of the total times is greater than the third threshold value (YES in ACT 133), the control section 11 predicts that the sheets in the reuse stack 22 will stick, and then (ACT 134) is executed. In (ACT 134), the control section 11 gives an instruction to the paper feed section 21 to stop feeding a next sheet, and instructs the display section 14*a* to display a warning of 'it is predicted that the sheets will stick'.

The user removes the sheets in the reuse stack 22 according to the warning displayed on the display section 14*a*. If the sheet sensor 28 detects that the sheets in the reuse stack 22 are removed, the control section 11 clears the cumulative printing ratio, the cumulative count and the cumulative printing ratio history stored in the storage section 12*a* to 0 (ACT 136), and then the sheet sticking prediction is ended.

In (ACT 133), if the value of the total times is not greater than the third threshold value (NO in ACT 133), the control section 11 updates the cumulative count stored in the storage section 12*a* to the total times (ACT 137). In (ACT 137), if the cumulative count in the storage section 12*a* is updated, the sheet sticking prediction is ended. During the sheet sticking prediction period, the control section 11 erases the printed image on the sheet using the erasing unit 17 after the processing in (ACT 101) and (ACT 102) is carried out.

In example 3, if the sum of the reuse times marks containing the new reuse times marks obtained from the image signals of the first surface and the second surface of the sheet is greater than the third threshold value, a warning of 'it is predicted that the sheets will stick' is displayed for a user to urge the user to remove the sheets from the reuse stack 22. Thereby, the user removes the sheets before the sheets stick to each other at a time when the sticking of the sheets is predicted according to the sum of the reuse times marks, instead of a preset sheet removal time. The method of example 3 may thus prevent frequent sheet removing operations performed by the user, thereby improving the operability in a case of reusing a sheet.

Example 4

Figure 7:
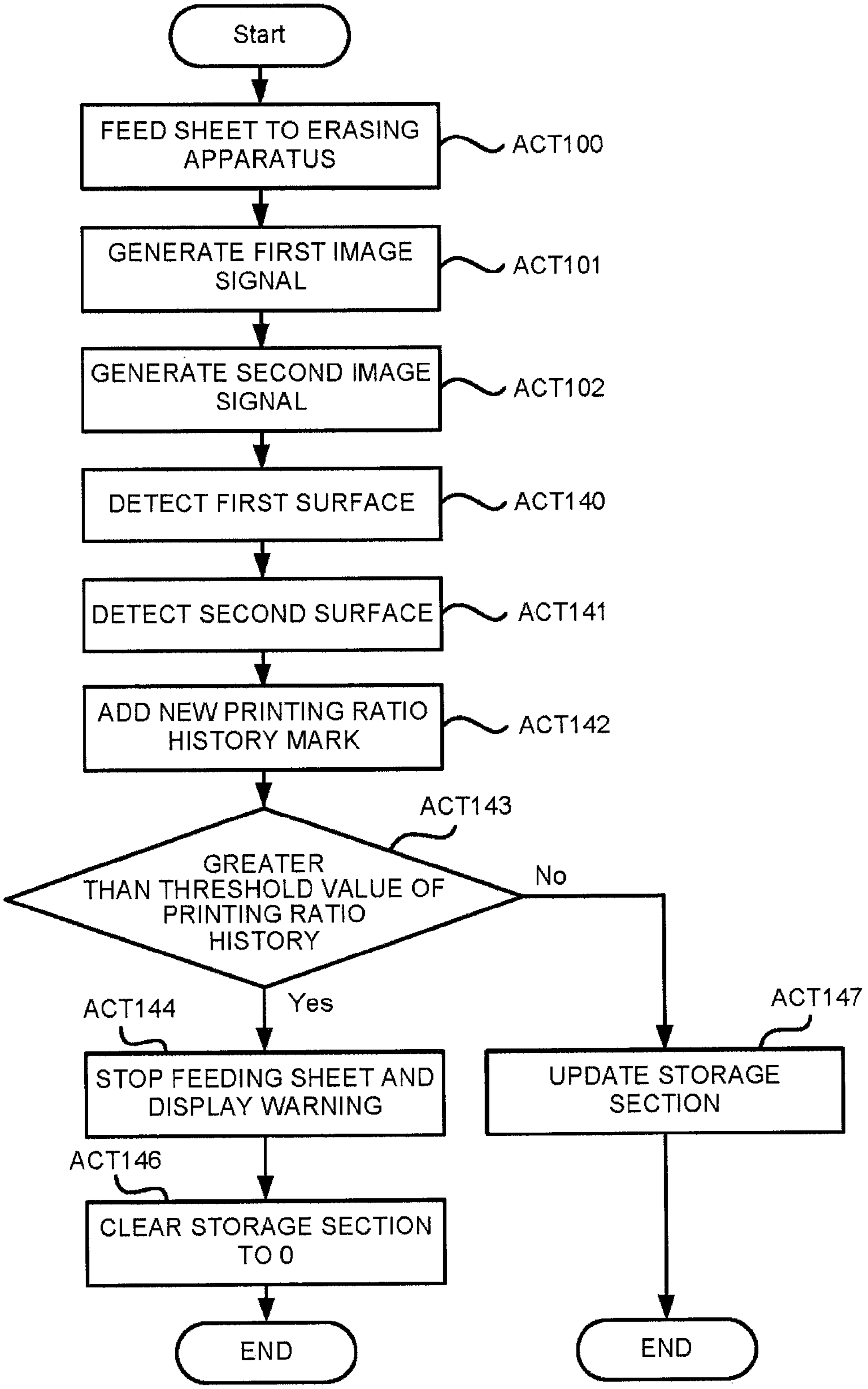
FIG. 7 is a flowchart illustrating a fourth example of the sheet sticking prediction method according to the embodiment.

In example 4 of the embodiment, the control section 11 carries out the fourth prediction control to predict the sticking of the sheets. The method of example 3 predicts the sticking of the sheets according to the sum of the reuse times marks, while the method of example 4 predicts the sticking of the sheets according to the total printing ratio. The sheet sticking prediction in example 4 is described with reference to the flowchart shown in FIG. 7.

After the image erasing operation of the erasing apparatus 10 is started, the processing from (ACT 100) to (ACT 102) is the same as in example 3. If the second image signal is generated in (ACT 102), the control section 11 detects a new printing ratio mark of the first surface of the sheet from the first image signal (ACT 140). The control section 11 detects a new printing ratio mark of the second surface of the sheet from the second image signal (ACT 141). The control section 11 adds the detected new printing ratio of the first surface and the second surface to the cumulative printing ratio stored in the storage section 12*a* to calculate the total printing ratio (ACT 142). The control section 11 compares the total printing ratio with the threshold value of the printing ratio to determine whether or not the total printing ratio is greater than the threshold value of the printing ratio (ACT 143).

If the total printing ratio is greater than the threshold value of the printing ratio (YES in ACT 143), the control section 11 predicts that the sheets in the reuse stack 22 will stick, and then (ACT 144) is executed. In (ACT 144), the control section 11 gives an instruction to the paper feed section 21 to stop feeding a next sheet, and instructs the display section 14*a* to display a warning of 'it is predicted that the sheets will stick'.

If the user removes the sheets in the reuse stack 22, the control section 11 clears the cumulative printing ratio, the cumulative count and the cumulative printing ratio stored in the storage section 12*a* to 0 (ACT 146), and then the sheet sticking prediction is ended.

In (ACT 143), if the total printing ratio is not greater than the threshold value of the printing ratio (NO in ACT 143), the control section 11 updates the cumulative printing ratio stored in the storage section 12*a* to the total printing ratio (ACT 147), and then ends the sheet sticking prediction. During the sheet sticking prediction period, the control section 11 erases the printed image on the sheet using the erasing unit 17 after the processing in (ACT 101) and (ACT 102) is carried out.

In example 4, if the total printing ratio containing the new printing ratio mark obtained from the image signals of the first surface and the second surface of the sheet is greater than the threshold value of the printing ratio, the user is urged to remove the sheets from the reuse stack 22. The user removes the sheets before the sheets stick to each other at a time when the sticking of the sheets is predicted according to the total printing ratio, instead of a preset sheet removal time. The method of example 4 may thus prevent frequent sheet removing operations performed by the user, thereby improving the operability in a case of reusing a sheet. The method of example 4 can detect the past total printing ratio of the sheet, and determine the amount of the toner attached to the sheet with high precision, thereby improving the precision of the sheet sticking prediction.

In addition, the prediction of the sticking of the upper and lower sheets stacked in the reuse stack 22 based on the subroutine of example 1 may be applied to example 4 to predict the sticking of the sheets according to the total printing ratio, as well as the sticking of the upper and lower sheets. For example, in example 4, after the new printing ratio history of the second surface (opposing surface) of the sheet is detected in ACT 141, the printing ratio of the upper surface of the preceding sheet is added to the new printing ratio of the second surface (opposing surface) detected in ACT 141. In a case where the added up printing ratio is greater than the second threshold value, it is predicted that the sheet subjected to image reading processing will stick to the preceding sheet in the reuse stack 22. The sticking of the upper and lower sheets is predicted and the user is urged to remove the sheets, therefore, the sticking of the sheets is prevented more reliably even in a case where the sticking of the sheets is not predicted according to the total printing ratio.

In accordance with the embodiment, when the recording media are stacked in the sheet placing section, the sticking of the recording media is predicted according to the toner image on the recording medium obtained by reading the image information of the recording medium, and the user is urged to remove the recording media from the sheet placing section. The user removes the sheets before the sheets stick to each other at timing when the sticking of the sheets is predicted, instead of a preset sheet removal time. In accordance with the embodiment, frequent sheet removing operations performed by the user may be prevented, thereby improving the operability in a case of reusing a sheet.

In the embodiment, no limitation is given to the sheet processing apparatus, for example, in an image forming apparatus, in order to prevent the sticking of sheets on which a toner image is heated and fixed on a paper discharge tray, the sticking of sheets on the paper discharge tray may be predicted.

While certain embodiments have been described these embodiments have been presented by way of example only, and are not intended to limit the scope of the inventions. Indeed, the novel apparatus and methods described herein may be embodied in a variety of other forms. Furthermore, various omissions, substitutions and changes in the form of the apparatus and methods described herein may be made without departing from the spirit of the inventions. The accompanying claims and there equivalents are intended to cover such forms of modifications as would fall within the scope and spirit of the invention.

What is claimed is:

1. A sheet processing apparatus, comprising:

a sheet tray in which recording sheets are to be stacked;

a conveyance module configured to convey recording sheets to the sheet tray for stacking;

an image reader section configured to read image information of each recording sheet on a conveyance path of the conveyance module before the recording sheet is stacked on the sheet tray; and a controller configured to receive, for each recording sheet to be stacked on the sheet tray, image information from the image reader section and calculate a first value, the first value corresponding to a total coverage amount of toner on the recording sheet, to calculate a sum of the first values of recording sheets already stacked on the sheet tray and the first value of a next recording sheet to be stacked in the sheet tray, compare the sum to a predetermined threshold value and stop the stacking of the next recording sheet on the sheet tray when the sum exceeds the predetermined threshold value and to continue the stacking of the next recording sheet on the sheet tray when the sum is less than the predetermined threshold value.

2. The sheet processing apparatus according to claim 1, wherein the controller is configured to issue a warning message when the sum exceeds the predetermined threshold value.

3. The sheet processing apparatus according to claim 1, wherein the image reader section is configured to read image information from both a first side and a second side of the recording sheets, and the controller is configured to calculate values corresponding to a coverage amount of toner on each side the recording sheets from the image information read by the image reader section and to control the conveyance module such that the side of the next recording sheet to be stacked on the sheet tray having a greater coverage amount of toner is facing up or down according to a coverage amount of toner on an upward facing side of a previous recording sheet stacked in the sheet tray.

4. The sheet processing apparatus according to claim 3, further comprising:

a reversal mechanism configured to orient a recording sheet on the conveyance path of the conveyance module from first side up to second side up before the recording sheet is stacked in the sheet tray.

5. The sheet processing apparatus according to claim 1, wherein the image information includes a plurality of pixels, each with a color value, and the controller is configured to calculate the first value for the next recording sheet to be stacked in the sheet tray based on the color values of the plurality of pixels.

6. The sheet processing apparatus according to claim 1, wherein the first value of the next recording sheet to be stacked in sheet tray is determined by reading a mark included on the recording sheets that indicates a total number of times an image has been printed on the recording sheet.

7. The sheet processing apparatus according to claim 6, wherein the total number of times is two or more.

8. A sheet processing apparatus, comprising:

a tray in which recording media are to be stacked;

a conveyance module configured to convey recording media to the tray for stacking;

an image reader configured to read image information on a first side and a second side of each recording medium on a conveyance path of the conveyance module before the recording medium is stacked on the tray; and a controller configured to determine, from image information from the image reader, a total coverage amount of toner on a first side of a next recording medium to be stacked in the tray onto an uppermost recording medium in the tray and a total coverage amount of toner on a second side of the next recording medium, to control the conveyance module so as to orient the one of the first and second sides having the lesser total coverage amount of toner to face the uppermost recording medium on the tray, to calculate a sum of the total coverage amount of toner on the one of the first and second sides of the next recording medium having the lesser coverage amount of toner and a previously determined total coverage amount of toner on an upper facing side of the uppermost recording medium on the tray, to compare the sum to a predetermined threshold value and stop the stacking of the next recording medium on the tray when the sum exceeds the predetermined threshold value and to continue the stacking of the next recording medium on the tray when the sum is less than the predetermined threshold value.

9. The sheet processing apparatus according to claim 8, wherein the controller is configured to display a warning message when the sum exceeds the predetermined threshold value.

10. The sheet processing apparatus according to claim 8, wherein the image information includes a plurality of pixels, each with a color value.

11. The sheet processing apparatus according to claim 8, further comprising:

a reversal mechanism configured to orient the next recording medium on the conveyance path of the conveyance module such that the first or second side is facing down prior to being stacked in the tray.

* * * * *